United States Patent [19]

Leitz et al.

[11] Patent Number: 4,605,304
[45] Date of Patent: Aug. 12, 1986

[54] ANGLE-MEASURING INSTRUMENT WITH A COARSE-FINE DRIVE ARRANGEMENT

[75] Inventors: Helmut Leitz, Königsbronn; Günter Rometsch, Oberkochen, both of Fed. Rep. of Germany

[73] Assignee: Carl-Zeiss-Stiftung, Heidenheim, Fed. Rep. of Germany

[21] Appl. No.: 531,180

[22] Filed: Sep. 9, 1983

[30] Foreign Application Priority Data

Nov. 13, 1982 [DE] Fed. Rep. of Germany ....... 3242084

[51] Int. Cl.⁴ .................. G01B 11/26; G01C 1/06; G01C 1/00; F16H 35/18
[52] U.S. Cl. ..................... 356/138; 356/140; 356/142; 356/147; 33/281; 74/10.5; 74/10.6; 74/471 R
[58] Field of Search .......... 356/140, 142, 144, 147; 33/281, 285; 74/10.5, 10.6, 471 R

[56] References Cited

U.S. PATENT DOCUMENTS 2,757,567  8/1956  Hillman et al. .................... 33/281

FOREIGN PATENT DOCUMENTS 1216554  5/1966  Fed. Rep. of Germany .

Primary Examiner—R. A. Rosenberger
Assistant Examiner—Crystal Cooper
Attorney, Agent, or Firm—Walter Ottesen

[57] ABSTRACT

The invention is directed to an angle-measuring instrument such as a theodolite, tacheometer or the like having a coarse-fine drive arrangement for presetting a circle part of a graduated circle to a predetermined read-out value. In a preferred embodiment, a coaxial coarse-fine drive arrangement is actuated by a single control knob which is part of an adjustable drive which can be operated in two positions. In the first position, the adjustable drive functions as a coarse drive and includes a spur gear that meshes with a gear on the carrier of the graduated circle to permit adjusting the circle part to obtain a coarse setting thereof. When the control knob and adjustable drive are moved into the second position, the drive becomes completely disengaged from the carrier and functions as a fine drive that operates on a plane-parallel plate pivotally mounted in the read-out optical transmission path of the instrument to finely adjust the light rays passing therealong. Accordingly, the fine drive does not cause any movement of the circle part so that the coarse and fine drives do not interfere with each other mechanically.

10 Claims, 5 Drawing Figures

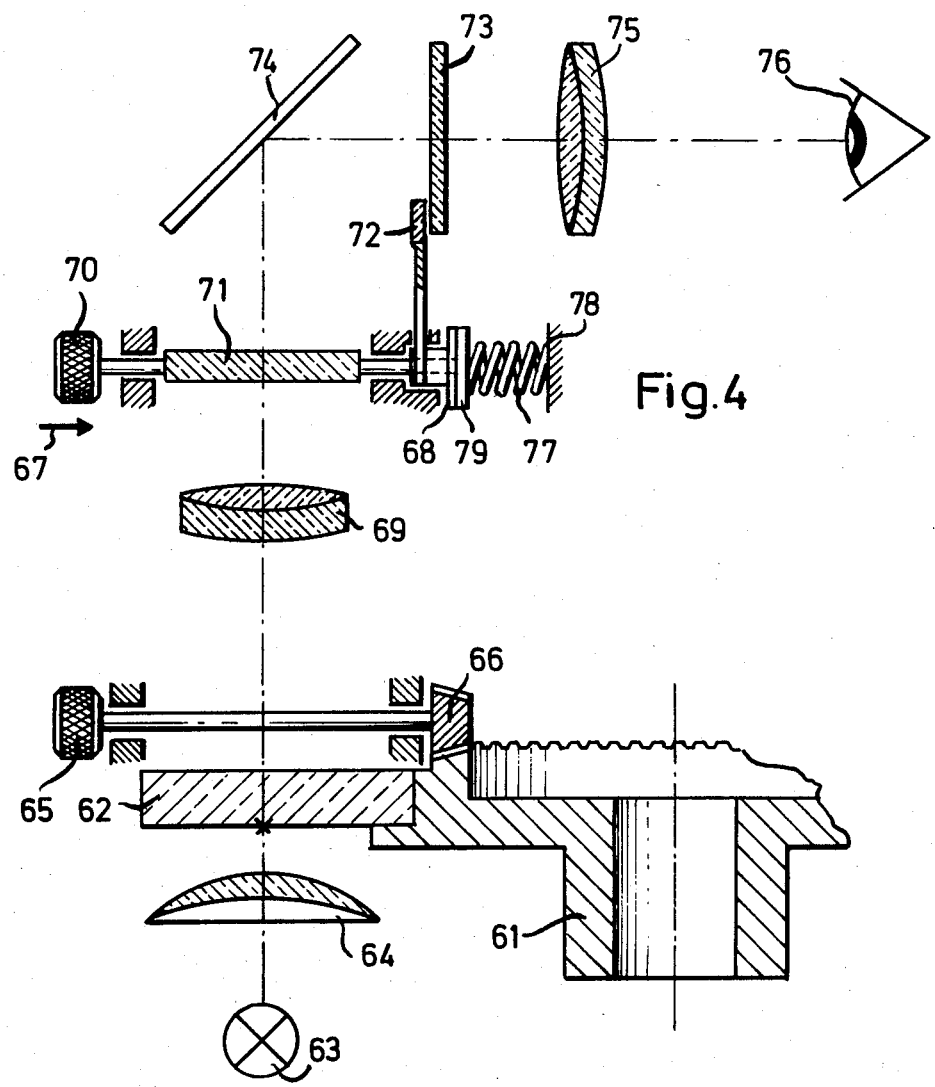

ANGLE-MEASURING INSTRUMENT WITH A COARSE-FINE DRIVE ARRANGEMENT

FIELD OF THE INVENTION

The invention relates to angle-measuring instruments such as a theodolite, tacheometer or the like equipped with a coarse-fine drive arrangement for presetting a circle part of the graduated circle to a predetermined read-out value. The invention also includes a method of presetting the circle part to the predetermined read-out value.

BACKGROUND OF THE INVENTION

Angle-measuring instruments of the kind referred to above equipped with optical-analog read-out means for the horizontal circle require an arrangement for positioning the circle so that when the instrument is set up, a predetermined read-out value can be set with respect to a predetermined direction in the topography. For this reason, the horizontal circle of these instruments is rotatable with respect to the stationary lower portion of the housing as well as with respect to the upper portion of the instrument with which the telescope is associated.

With instruments of lower and medium accuracy, the circle part is coupled via a repetition clamp with the upper part of the instrument and is moved along by the drive of the upper part. Such repetition clamps are also known as so-called Mahler clamps.

Instruments of medium, high and highest accuracy are provided with a separate circle drive for setting the desired direction indication with the upper and lower parts held stationary. To enable the circle part to be set rapidly with the needed accuracy, this drive is configured in part as a two-stage drive. With a coarse drive, the circle part can be adjusted over the entire angle range of 360°; whereas, an additional fine drive is provided for finely setting the circle part in a limited angle range.

Such a drive for the circle part is, for example, described on page 107 of the text entitled "Instrumentenkunde der Vermessungstechnik", 5th Edition, by Dr. Fritz Deumlich and published by VEB Verlag für Bauwesen, Berlin, 1972. In this arrangement, a first adjusting drive arrangement functions as a coarse drive and rotates the carrier of the circle part via a spur gear system; whereas, a high step-down lever gear system superimposes the movement of a second adjusting drive on the coarse drive. The second adjusting drive functions as a fine drive and acts on the carrier of the circle part by means of a slip coupling.

It is however difficult and requires additional means to configure both transmissions so that they do not interfere with each other in order to enable the circle part to be preset with satisfactory accuracy. Such means are not disclosed in the description provided by the above-identified reference.

German Pat. No. 12 16 554 discloses a device for automatically setting a shaft to a predetermined angular value. In this arrangement, a fine adjust knob rotates two plane-parallel plates in respective optical paths. The paths extend between respective sets of graduations of a graduated circle and respective photoelectric read-out devices. The read-out devices provide a signal to energize a motor coupled to the shaft of the coarse drive. The motor rotates the shaft an amount corresponding to the fine preset angle value.

In this arrangement, the precision of the shaft position setting is determined by the motor-driven coarse drive. Furthermore, the configuration of the apparatus is complicated.

SUMMARY OF THE INVENTION

It is an object of the invention to provide an angle-measuring instrument with a coarse-fine drive for a circle part of the graduated circle which permits a precise setting to be made with the least possible design cost. Another object of the invention is to provide a method of presetting a circle part to a predetermined read-out value.

According to the invention, the fine drive operates on an optical micrometer or its index. The micrometer is arranged in the optical transmission path which transmits an optical image from the circle part to the index whereat the read-out value may be viewed by an observer. The angular position of the graduated circle is unchanged by the action of the fine drive.

In the angle-measuring instrument of the invention, the coarse drive and the fine drive of the graduated circle are mechanically separate from each other since the fine drive does not cause an actual movement of the circle part; instead, the read-out value of the circle part is shifted with respect to its index. Accordingly, the coarse drive and the fine drive can not influence each other or affect each other mechanically.

Plane-parallel plate micrometers are well known components in the design and construction of angle-measuring instruments such as theodolites and the like. Therefore, it has long been conventional practice with theodolites to adjust the zero point of the vertical circle by arranging an optical micrometer in the read-out optical transmission path thereof. As a rule, the plane-parallel plate micrometer includes a pivotally mounted plane-parallel plate having an inclination which is permanently set by adjusting screws when the instrument is calibrated.

Also, plane-parallel plate micrometers have long been used to obtain a fine read-out of the horizontal circle in theodolites. However, and without more, it is not possible to apply the micrometer utilized in the read-out of the horizontal circle to also preset the circle part.

The angle-measuring instrument of the invention includes a housing, a graduated circle rotatable with respect to the housing, and an index mounted in the housing. An optical transmission path transmits an optical image of the circle part of the graduated circle to the index whereat the same can be viewed by an observer. A coarse-fine drive arrangement presets the circle part to a predetermined read-out value that includes a predetermined micrometer component value. The coarse-fine drive arrangement includes coarse drive means for angularly adjusting the graduated circle to bring the circle part corresponding to the predetermined read-out value into the optical transmission path so as to cause the read-out value to appear as a scale value at the index. An optical micrometer shifts the light rays in the transmission path an amount corresponding to the micrometer component value thereby displacing the scale value away from the index. Finally, an optical fine drive finely shifts the light rays in the transmission path so as to cause the scale value to again be aligned with the index whereby the predetermined read-out value can be read from the circle part and the angular position of the graduated circle remains unchanged.

The optical fine drive can include a separate plane-parallel plate pivotally mounted in the optical transmission path. According to a preferred embodiment, the fine drive operates on this plane-parallel plate via a step-down transmission.

More specifically, this preferred embodiment of the invention includes a coarse-fine drive arrangement having an adjustable drive. The adjustable drive includes a gear mounted thereon which can be disengagedly connected to a gear on the carrier of the horizontal circle. The adjustable drive also includes an actuator coupled to the plane-parallel plate via a means for transmitting movement.

The adjustable drive is mounted in the housing so as to be movable between first and second positions. In the first position, the gear of the adjustable drive engages the carrier gear thereby permitting adjustment of the graduated circle. In the second position, the gear is completely disengaged from the carrier gear and a friction coupling engages the actuator whereupon the adjustable drive can be adjusted to cause the actuator to transmit movement via the movement transmission means to the plane-parallel plate for finely shifting the light rays in the optical transmission path. The actuator and the movement transmission means conjointly define a step-down transmission.

The second position of the adjustable drive is its rest position whereat the same operates as a fine drive. This considerably simplifies the operation of the angle-measuring instrument according to the invention.

It is advantageous if the actuator of the step-down transmission is in the form of a helical cam and if the movement transmission means includes a lever connected to the plate. Resilient means in the form of a spring biases the lever against the cam whereby the plane-parallel plate is tilted about its pivot axis in response to an adjustment of the adjustable drive in its second position. In this way, a sharply stepped down adjustment is obtained with simple means. Further, this fine adjustment is performed without any interference whatsoever from the coarse adjustment drive arrangement.

The above embodiment is very advantageous because its application is very broad. Specifically, it is suitable for angle-measuring instruments wherein a micrometric fine read-out is available as well as those angle-measuring instruments which are without this capability. A complete description of the read-out optical system of a theodolite is found, for example, in U.S. Pat. No. 2,757,567.

In two other embodiments of the invention, a micrometric read-out is required. In one of these embodiments, the fine drive is configured to cause a displacement of the index of the micrometer with respect to its micrometer scale.

In the other embodiment, the fine drive operates on the plane-parallel plate of a micrometer already available in the instrument. The fine drive includes means for disengaging the scale from the rotatable drive for pivoting the plate. The knob which is used for obtaining the actual micrometric read-out is also actuated for finely adjusting the read-out value. This fine adjustment is obtained by first depressing the knob to disengage the scale from the pivot shaft of the plate whereafter the knob is adjusted to rotate the shaft and plate to shift the light rays to finely adjust the read-out value.

BRIEF DESCRIPTION OF THE DRAWING

The invention will now be described with reference to the drawing wherein:

FIG. 2b illustrates the helical cam of the fine drive of the coarse-fine drive arrangement of FIG. 2a;

DESCRIPTION OF THE PREFERRED EMBODIMENTS OF THE INVENTION

Figure 1:
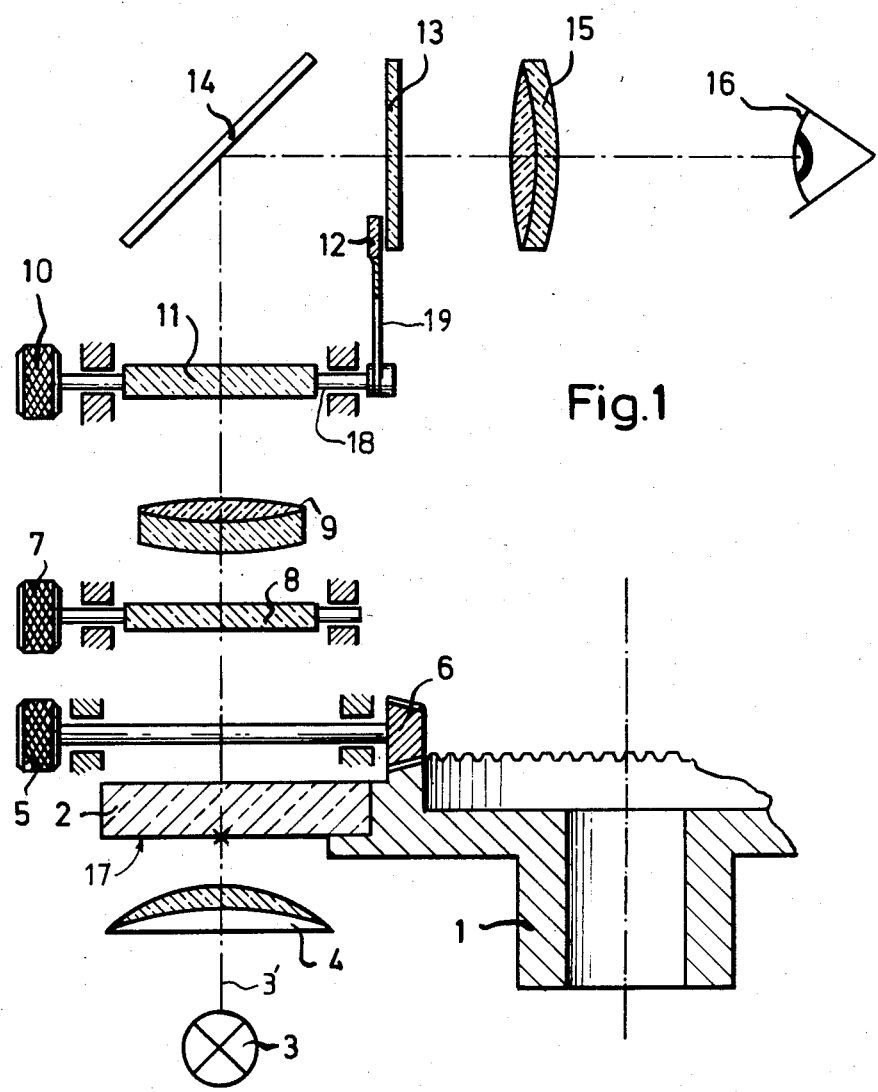
FIG. 1 is a schematic of a first embodiment of the invention showing a theodolite equipped with a coarse-fine drive arrangement as required by the invention.

Referring to FIG. 1, reference numeral 1 identifies the carrier of the horizontal glass circle 17 of a theodolite and is rotatable about the vertical axis of the latter. The graduations of the horizontal circle are illuminated through a condensor 4 and are imaged onto the index 13 by an objective 9 whereat they can be viewed by an observer 16 with the aid of an ocular 15.

Reference numeral 11 identifies a pivotally mounted plane-parallel plate of an optical micrometer for obtaining a micrometerical read-out of a circle part 2 of the horizontal circle 17 in the conventional manner. The plate 11 is connected to an adjusting knob 10. The micrometer scale 12 is located in the plane of the index 13 and is mounted on the pivot shaft 18 of plate 11 via a lever 19. The mirror 14 acts to deflect the rays of light in the optical transmission path 3' which are viewed by the observer.

The carrier 1 of the circle part 2 can be coarsely adjusted with the adjusting knob 5 via spur gear 6. The fine adjustment of the read-out value of the circle part 2 is achieved by setting adjustment knob 7 which pivots a second plane-parallel plate 8 in the optical transmission path 3'.

The adjusting procedure will now be described: First, the telescope of the theodolite is adjusted to a point or marking of interest in the topography. Thereafter, the circle part 2 is angularly displaced with the aid of the coarse drive 5 so that the predetermined read-out value appears in the index 13 as a coarse scale value. Subsequently, the predetermined micrometer component value which is also to be preset is set by adjusting the knob 10. With this setting, the scale value of the circle part 2 can be displaced with respect to its index 13. A precise fine adjustment of this scale value is obtained by adjusting the fine drive adjustment knob 7 by pivoting the plane-parallel plate 8 until the scale value is exactly aligned with its index 13.

FIG. 2 is a detailed view of the "drive" of the circle part 2 in the context of a coaxial coarse-fine drive having only a single hand-operated adjustment knob. A sleeve is fixedly mounted to the housing of the theodolite with screws 20' and includes a bore for rotatably journalling shaft 27 therein. An adjusting knob 25 is secured to the shaft 27. Gear means in the form of a spur gear 23 is mounted on the other end of shaft 27. The shaft 27 is also mounted in the sleeve 20 so as to be movable in the direction of its longitudinal axis and can be moved against the force of spring means in the form of a leaf spring 24 into a first position whereat the spur gear 23 engages the gear 26 of the carrier 21 of a graduated horizontal glass circle of which reference numeral 22 indicates a circle part thereof. With gears 23 and 26 engaged, the adjusting knob 25 can be rotated to obtain a coarse adjustment of the circle part 22.

Figure 2A:
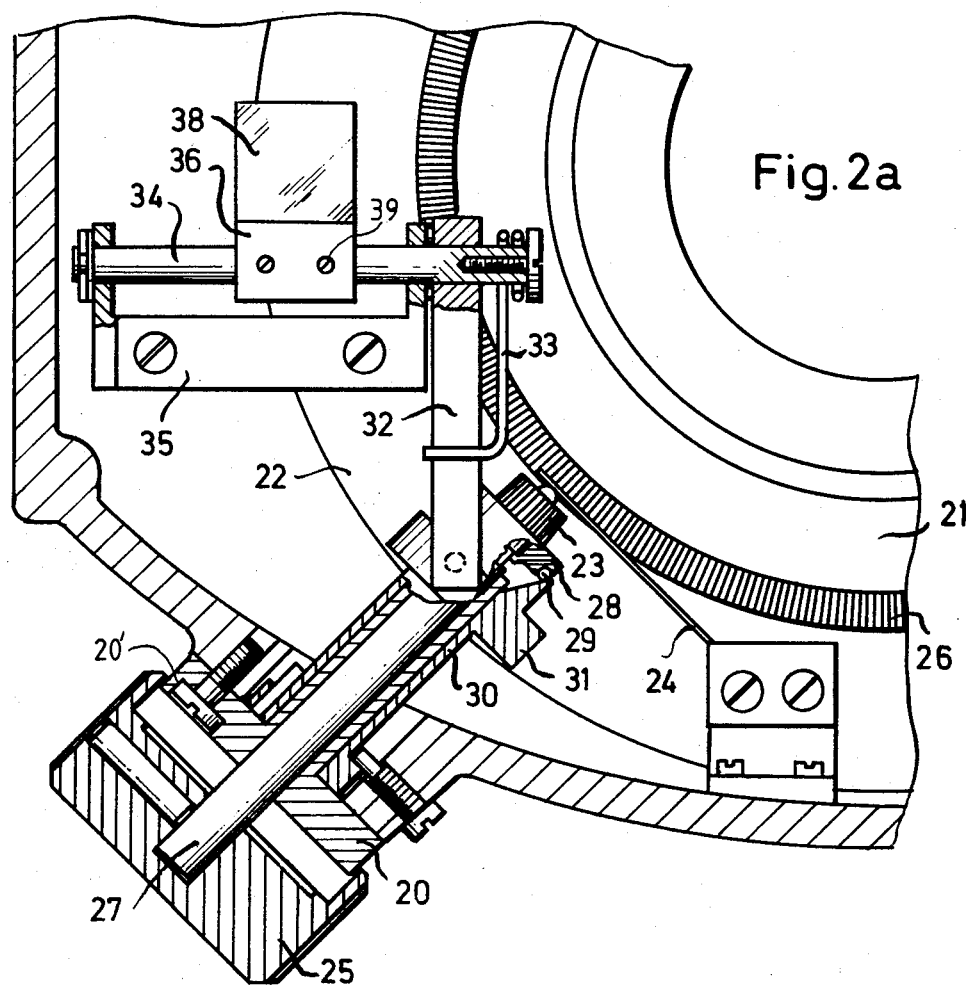
FIG. 2a is a detailed view of the theodolite showing a preferred embodiment of the coarse-fine drive arrangement.

When the knob 25 is released, the shaft 27 is moved from the first position to the second position shown in FIG. 2a whereat the spur gear 23 is completely disengaged from the carrier gear 26.

Figure 2B:
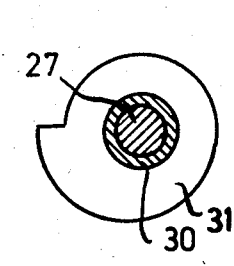

Still referring to FIG. 2a, a disc 28 is connected to shaft 27 and friction coupling means in the form of friction ring 29 holds disc 28 tightly against the hollow shaft 30 when the shaft 27 is in its second position. The hollow shaft 30 is mounted on sleeve 20 and is disposed in surrounding relationship thereto. A helical cam 31 is mounted on the hollow shaft 30 and is shown in FIG. 2b. The cam 31 and hollow shaft 30 together define actuator means.

A lever 32 has one end which lies against the cam 31 and is biased thereagainst with the aid of resilient means in the form of spring 33. At its other end, the lever 32 is fixedly attached to a pivot shaft 34 which is journalled in a yoke 35. Light shifting means in the form of a plane-parallel plate 38 is held by a carrier 36 which, in turn, is securely mounted to shaft 34 with the aid of screws 39. The plate 38 is disposed in the read-out optical transmission path of the theodolite. When the shaft 27 is in its second position, the knob 25 can be adjusted to cause the actuator means to impart movement to movement transmission means which includes the lever 32 and spring 33 whereby the plane-parallel plate 38 is tilted about its pivot axis for finely shifting the light rays in the optical transmission path.

Figure 3:
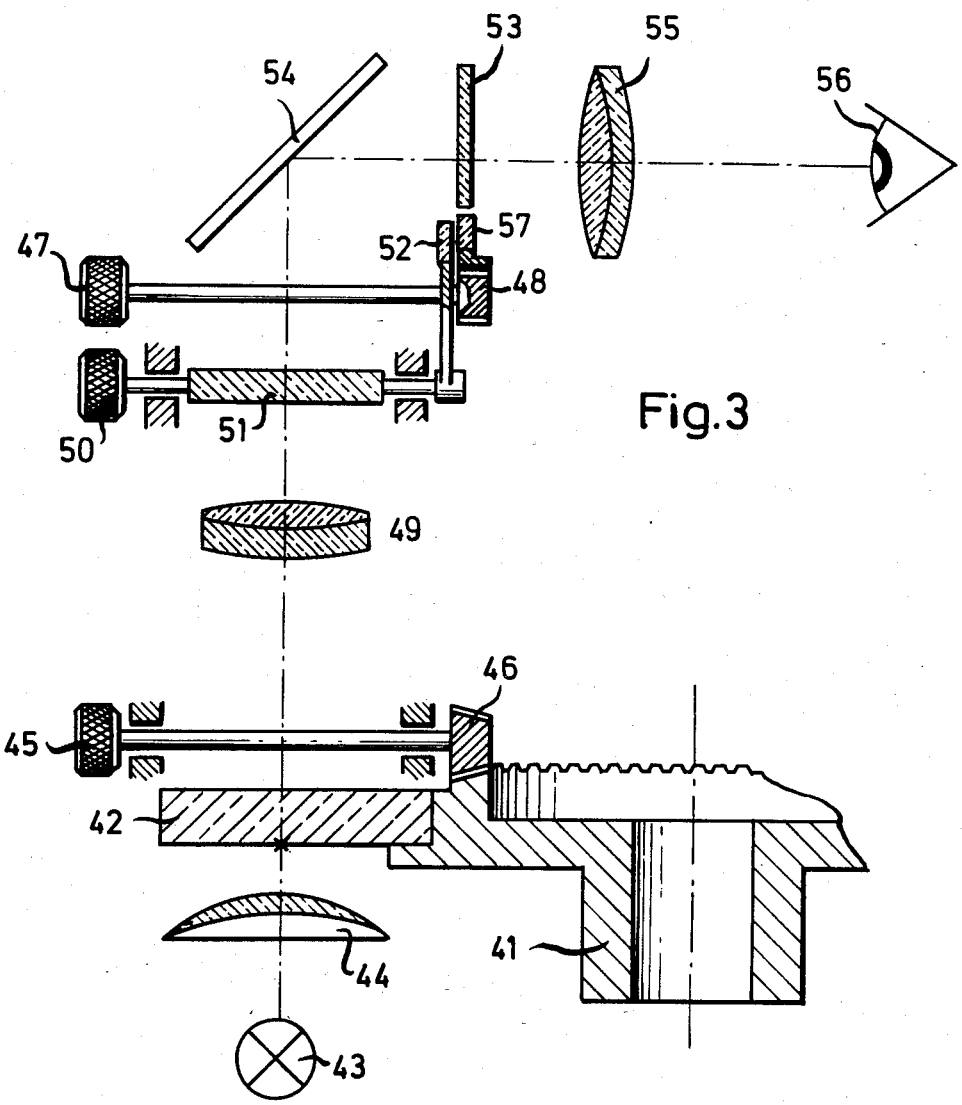
FIG. 3 is a schematic of a second embodiment of the invention wherein the fine drive includes means for shifting the index of the micrometer; and, FIG. 4 is a schematic of a third embodiment of the invention wherein the scale of the micrometer is disengagedly connected to the adjustable pivot shaft of the plane-parallel plate of the micrometer.

The embodiment of FIG. 3 differs from the embodiment of FIG. 1 in that the separate plane-parallel plate 8 has been removed from the optical transmission path. In lieu thereof, an adjusting knob 47 is provided which is connected with a gear 48. The gear 48 meshes with tooth means on the carrier of index 57 of the micrometer scale 52. The index 57 is displaceable in the intermediate image plane. Attention is called to the fact that the components of FIG. 3 which correspond to those of FIG. 1 have reference numerals to which the numeral 40 has been added.

The adjustment procedure for this embodiment is conducted somewhat differently. First, the telescope of the theodolite is set to a predetermined marker in the topography. Thereafter, the circle part 42 is displaced with the aid of the coarse drive 45 so that a coarse setting of the read-out value appears in the index 53 as a scale value. Then the read-out value is finely adjusted with precision by adjusting adjustment knob 50 to pivot plate 51 so that the read-out value is aligned with the index 53. Thereafter, the micrometer scale 52 will show a value which, in general, will be false. Finally, with the aid of adjustment knob 47, the index 57 of the micrometer read-out is displaced to the predetermined micrometer component value which is to be preset.

Also in the embodiment of FIG. 4, the separate plane-parallel plate 8 of FIG. 1 has been eliminated. The remaining components described in connection with FIG. 1, namely: components 1 to 7 and 9 to 15 are provided with reference numerals 61 to 67 and 69 to 75, respectively. The fine adjustment of the read-out value of the circle 62 and the micrometric read-out occur here by actuating the same adjustment knob 70 which is displaceable against the force of a spring 77 braced against the housing part 78. The adjusting knob 70 and the plane-parallel plate 71 are connected with the micrometer scale 72 via a coupling 68/79. The knob 70 and the plate 71 can be disconnected from the micrometer scale 72 by depressing the adjusting knob 70.

To preset the circle part to a predetermined read-out value, the telescope of the instrument is set to a marking in the topography. Thereafter, the coarse drive 65 is adjusted to obtain a coarse setting of the read-out value at the index 73. Then, the micrometer component value is preset with the coupling 68/79 engaged. With this action, the plate 71 shifts the read-out value of the circle 62 in the index 73 which, however, is not of further interest. Finally, the knob 70 is depressed and the scale 72 is separated from the plate 71 and the plate 71 is pivoted about its pivot axis to finely adjust the read-out value of the circle 62.

It is understood that the foregoing description is that of the preferred embodiments of the invention and that various changes and modifications may be made thereto without departing from the spirit and scope of the invention, as defined in the appended claims. In particular the invention is not limited to instruments having an optical micrometer fine read-out. So the fine adjustment drive 7/8 of the embodiment of FIG. 1 can also be used in theodolites having a fine read-out scale engraved directly into the circle 17 and being without a separate micrometer 10/11/12.

What is claimed is:

1. An angle-measuring instrument such as a theodolite, tacheometer or the like, comprising: a housing; a graduated circle supported on a carrier mounted so as to be rotatable with respect to the housing; an index mounted in the housing; an optical transmission path for transmitting an optical image of a circle part of the graduated circle to the index whereat the same may be viewed by an observer; and, a coarse-fine drive arrangement for presetting a circle part of the graduated circle to a predetermined read-out value that includes a predetermined fine read-out value, the coarse-fine drive arrangement including:

light-shifting means movably mounted in the optical transmission path for shifting the light rays passing therealong;

movement transmission means for transmitting an actuating movement to said light-shifting means;

a gear mounted on said carrier of the graduated circle; and, an adjustable drive including: gear means mounted thereon and adapted to be engageable with said carrier gear; and, actuator means forming part of said adjustable drive for actuating said movement transmission means;

said adjustable drive being mounted in said housing so as to be movable to a first position whereat said gear means engages said carrier gear thereby permitting adjustment of the graduated circle to bring the circle part corresponding to the predetermined read-out value into the optical transmission path so as to cause the predetermined read-out value to appear as a coarse scale value at the index; and said adjustable drive means also being mounted in said housing so as to be movable from said first position to a second position whereat said gear means is completely disengaged from said carrier gear and whereat said adjustable drive can be adjusted to cause said actuator means to transmit movement via said movement transmission means to said light-shifting means for finely shifting the light rays in the optical transmission path so as to cause said scale value to be aligned with said index whereby said predetermined read-out value can be read from said circle part and the angular position of said graduated circle remains unchanged.

2. The angle-measuring instrument of claim 1, said light-shifting means being a transparent plane-parallel plate pivotally mounted in the optical transmission path; said actuator means and said movement transmission means conjointly defining stepdown transmission means for imparting pivotal movement to said plane-parallel plate.

3. The angle-measuring instrument of claim 2, said adjustable drive comprising: a shaft rotatably mounted in said housing; and, a drive knob mounted on one end of said shaft; said gear means being a spur gear mounted on the other end of said shaft; said shaft being slideably mounted in said housing so as to be movable from said second position into said first position whereat said spur gear engages said carrier gear and said adjustable drive defines a coarse drive for bringing said circle part into said optical transmission path; said adjustable drive further comprising friction coupling means for connecting said actuator means to said shaft and drive knob when said shaft is in said second position.

4. The angle-measuring instrument of claim 3, said adjustable drive further comprising: spring means for biasing said shaft into said second position whereat said spur gear is completely disengaged from said carrier gear.

5. The angle-measuring instrument of claim 3, said actuator means comprising: a rotatable helical cam; and, said movement transmission means comprising: a lever connected to said plate; and resilient means for resiliently biasing said lever against said cam whereby said plane-parallel plate is tilted about its pivot axis in response to an adjustment of said drive knob when said shaft is in said second position wherein said adjustable drive defines a fine drive for finely shifting the light rays in the optical transmission path.

6. An angle-measuring instrument such as a theodolite, tacheometer or the like, comprising: a housing; a graduated circle supported on a carrier mounted so as to be rotatable with respect to the housing; an index mounted in the housing; an optical transmission path for transmitting an optical image of a circle part of the graduated circle to the index whereat the same may be viewed by an observer; and, a coarse-fine drive arrangement for presetting a circle part of the graduated circle to a predetermined read-out value that includes a predetermined micrometer component value, the coarse-fine drive arrangement including:

coarse drive means for angularly adjusting the circle part for obtaining a coarse positioning of the read-out value with respect to the index; and optical micrometer fine drive means mounted in the housing and including:

adjustable light-shifting means for shifting the light rays in said transmission path to finely adjust the read-out value with respect to the index whereby the angular position of the graduated circle remains unchanged;

scale means operatively connected to said light-shifting means for providing a set of units from which the shift of the light rays can be read;

scale index means coacting with said scale means to provide a reference against which the shift of the light rays can be measured; and, displacing means connected to said scale index means for displacing the same to the value of said micrometer component.

7. An angle-measuring instrument such as a theodolite, tacheometer or the like, comprising: a housing; a graduated circle supported on a carrier mounted so as to be rotatable with respect to the housing; an index mounted in the housing; an optical transmission path for transmitting an optical image of a circle part of the graduated circle to the index whereat the same may be viewed by an observer; and, a coarse-fine drive arrangement for presetting a circle part of the graduated circle to a predetermined read-out value that includes a predetermined micrometer component value, the coarse-fine drive arrangement including:

coarse drive means for angularly adjusting the circle part for obtaining a coarse positioning of the read-out value with respect to the index; and optical micrometer fine drive means mounted in the housing and including:

light-shifting means for shifting the light rays in said transmission path whereby the angular position of the graduated circle remains unchanged;

a micrometer scale disengagedly connected to said light-shifting means;

moving means connected to said light-shifting means for moving the same in said optical transmission path in a first mode of operation with said scale coupled thereto during which the light rays are shifted an amount corresponding to said micrometer component value;

said moving means comprising disengaging means for disengaging said scale from said light-shifting means;

said moving means being connected to said light-shifting means for also moving the same in said optical transmission path during a second mode of operation wherein said disengaging means is actuated and said scale is disengaged from said light-shifting means and wherein the light rays are further shifted to finely adjust the read-out value with respect to said index.

8. A method of presetting a circle part of the graduated circle of an angle-measuring instrument to a predetermined read-out value that includes a predetermined fine read-out value, the instrument having an optical transmission path for transmitting an optical image of the circle part to an index whereat a scale value contained in the optical image may be viewed by an observer and having a coarse drive for adjusting the angular position of the graduated circle, the method comprising the steps of:

coarsely adjusting the graduated circle in angular position to bring the circle part containing the predetermined read-out value into the optical transmission path so as to cause the read-out value to appear as a coarse scale value at the index; and, adjusting a light-shifting device arranged in the transmission path to finely shift the light rays passing therealong so as to cause said scale value to be aligned with said index whereby said predetermined read-out value including said predetermined fine read-out value can be read from said circle part and the angular position of said graduated circle remains unchanged.

9. A method of presetting a circle part of the graduated circle of an angle-measuring instrument to a predetermined read-out value that includes a predetermined micrometer component value, the instrument having an optical transmission path for transmitting an optical image of the circle part to an index whereat the same may be viewed by an observer and having a coarse drive for adjusting the angular position of the graduated circle, the instrument further having an optical micrometer equipped with an optical micrometer scale and a displaceable scale index, the method comprising the steps of:

angularly adjusting the circle part to obtain a coarse positioning of the read-out value with respect to the index;

adjusting the optical micrometer to shift the light rays in said transmission path to finely adjust the read-out value with respect to the index whereby the angular position of the graduated circle remains unchanged; and, displacing the scale index of the optical micrometer scale to the value of said micrometer component without effecting a further shift of said light rays.

10. A method of presetting a circle part of the graduated circle of an angle-measuring instrument to a predetermined read-out value that includes a predetermined micrometer component value, the instrument having an optical transmission path for transmitting an optical image of the circle part to an index whereat the same may be viewed by an observer and having a coarse drive for adjusting the angular position of the graduated circle, the method comprising the steps of:

angularly adjusting the graduated circle to bring the circle part corresponding to the predetermined read-out value into the optical transmission path so as to cause the read-out value to appear as a coarse scale value at the index;

adjusting the light-shifting device of an optical micrometer arranged in the transmission path to shift the light rays passing therealong an amount corresponding to said micrometer component value; and, disengaging the scale of said light-shifting device and again adjusting the light-shifting device for shifting the light rays to finely adjust the read-out value with respect to said index.

* * * * *